May 9, 1961
H. L. KNOLL ET AL
2,983,640
METHOD OF MAKING HONEYCOMB
Filed June 24, 1957
3 Sheets-Sheet 2
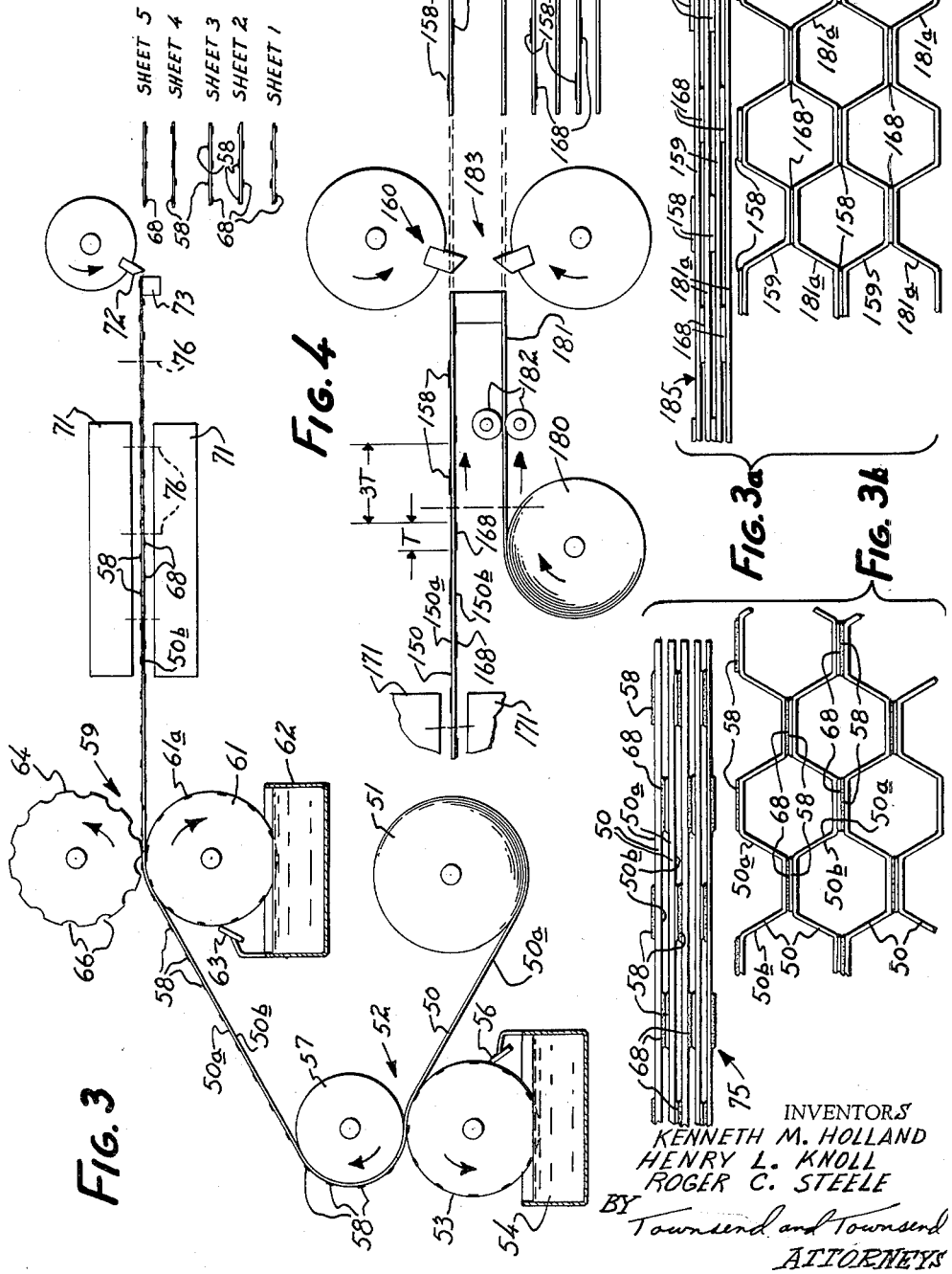
INVENTORS
KENNETH M. HOLLAND
HENRY L. KNOLL
ROGER C. STEELE
BY Townsend and Townsend
ATTORNEYS May 9, 1961 H. L. KNOLL ET AL 2,983,640
METHOD OF MAKING HONEYCOMB
Filed June 24, 1957 3 Sheets-Sheet 3
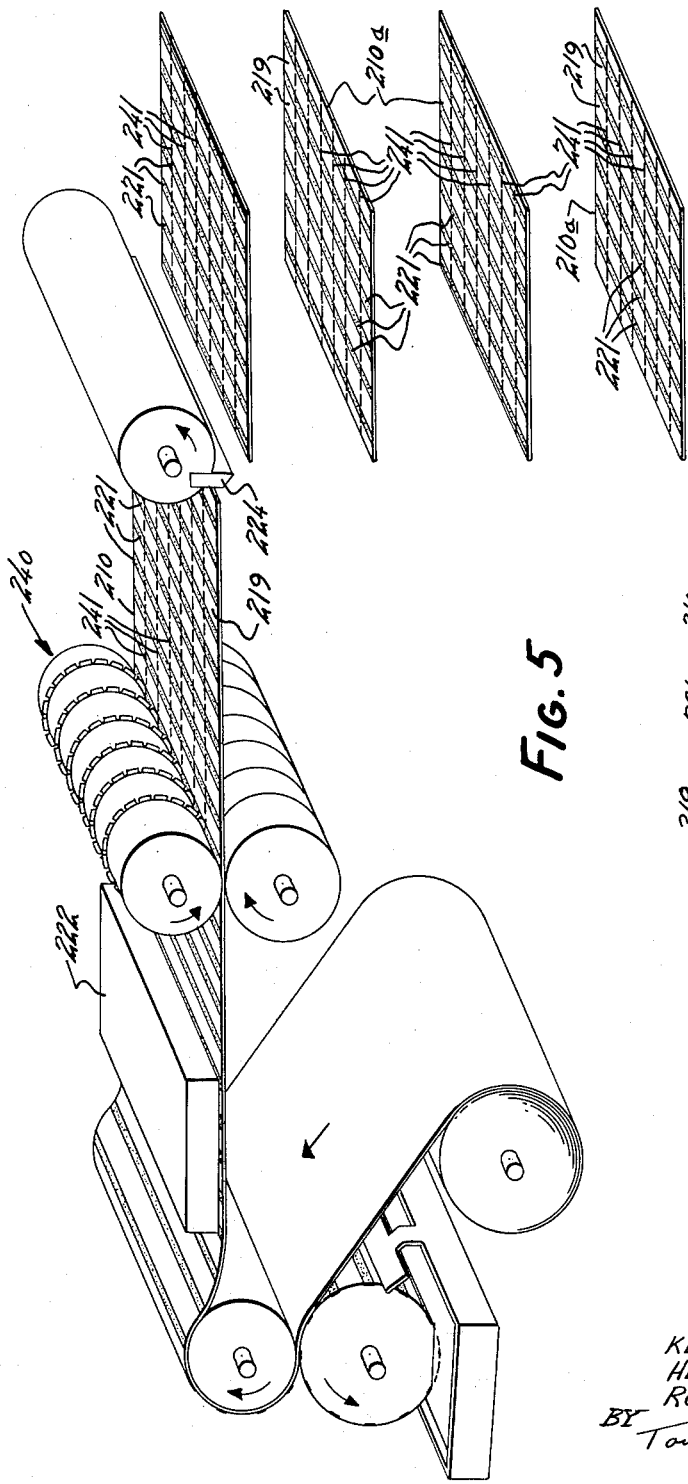
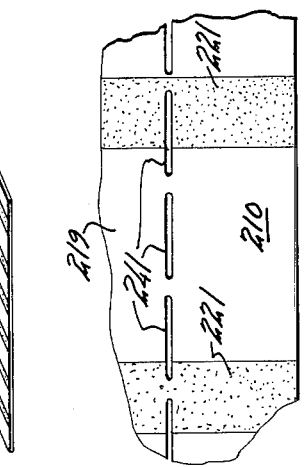
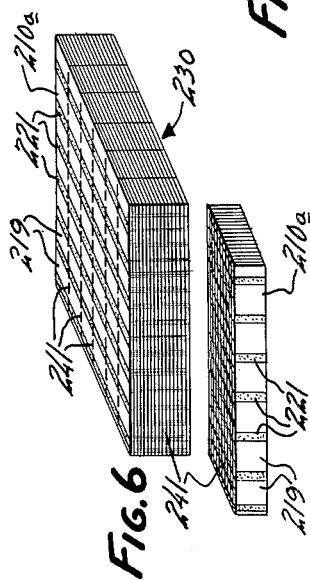
INVENTORS
KENNETH M. HOLLAND
HENRY L. KNOLL
ROGER C. STEELE
BY Townsend and Townsend
ATTORNEYS

United States Patent Office 2,983,640
Patented May 9, 1961

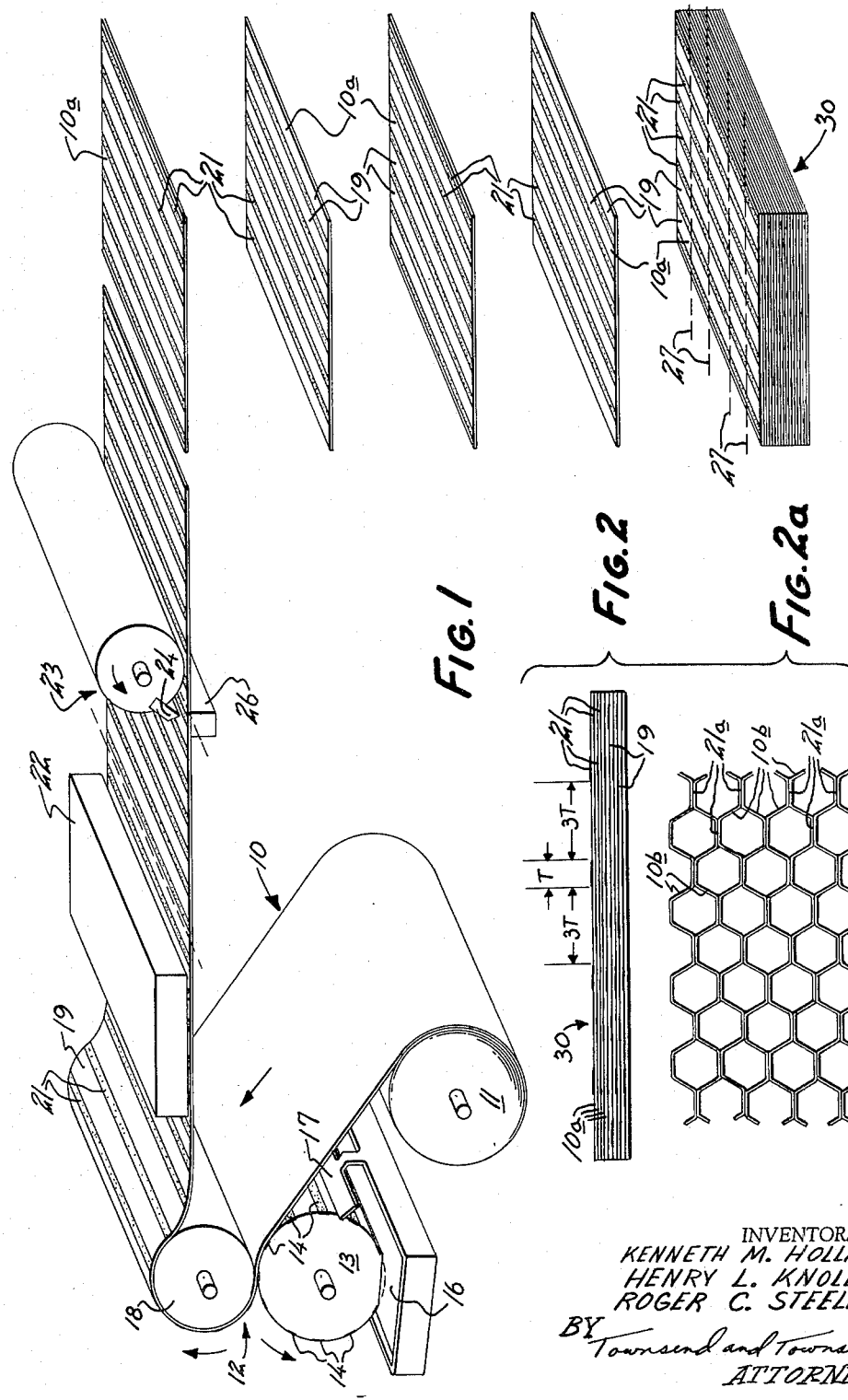

2,983,640
METHOD OF MAKING HONEYCOMB

Henry L. Knoll, Oakland, Kenneth M. Holland, El Cerrito, and Roger C. Steele, Oakland, Calif., assignors to Hexcel Products Inc., Berkeley, Calif., a corporation of California Filed June 24, 1957, Ser. No. 667,328

7 Claims. (Cl. 154—122)

This invention relates to a new and improved method of manufacturing expansible sections or blocks of structural honeycomb material.

Heretofore various ways have been proposed to manufacture structural honeycomb from continuous webs of sheet material such as paper, resin impregnated glass or textile fabric, or metal foil such as, for example, aluminum foil or stainless steel foil. Two such ways of making honeycomb material are disclosed and described in United States Letters Patents Nos. 2,610,934 and 2,734,843.

In each of the above mentioned patents spaced parallel glue lines are applied to the moving web in the direction of the lengthwise axis of the web. In each instance means are provided for superposing adjacent layers of the material into a stack in such manner that the adhesive lines between adjacent layers in the stack are staggered relative to one another. With the adjacent layers in the stack adhered to one another along these lines, the stack, or slices or sections cut therefrom, may be expanded into open cell honeycomb material.

The present invention embraces the concept of applying spaced parallel lines of adhesive extending transversely of the lengthwise axis of a continuous web of material, and thereafter superposing into a stack a plurality of layers of said web material and adhering adjacent layers within the stack to form a section of expansible honeycomb.

A feature and advantage obtainable in applying transverse rather than longitudinal adhesive lines to a continuously moving web is that it is possible to manufacture sections of honeycomb having greater length in the "ribbon" direction. In this connection an expanded section of honeycomb of the type herein referred to is characterized as comprising a plurality of sinusoidally or corrugated webs or ribbons of sheet material that are adhered together at their adjacent nodes. All of the sinusoidally curved or corrugated ribbons extend in a common direction and this has been referred to by the trade and in the art as the "ribbon direction" of the material. The ribbon direction of honeycomb has greater strength properties (both sheer and flexural) than the direction or axis of the material disposed transversely or normal to the ribbon direction. Consequently, and particularly in certain applications requiring relatively long unsupported structural spans it is desirable to fabricate sections of honeycomb sandwich core with substantially longer ribbon lengths than has been heretofore feasible with prior art methods of fabrication in which the adhesive lines are initially applied parallel to the lengthwise axis of the moving or continuous web of material from which the honeycomb is fabricated. In this specific regard, when honeycomb is fabricated by applying longitudinal adhesive lines to a continuous web, it is the width of the web that determines and limits the ribbon length of the honeycomb fabricated therefrom. In applying transverse adhesive lines to the web as contemplated by the present invention the ultimate obtainable ribbon length of the honeycomb fabricated therefrom is substantially unlimited and is proportionate to the length of sections cut from the web.

A further object of the invention is to teach a method of the type briefly mentioned above and which further embraces the concept of cutting or sheeting the continuous web material into sections of equal lengths and along predetermined cut lines that will orient successively cut sheets within the superposed stack in such manner that the adhesive lines adhering adjacent stacked sheets or layers together are properly staggered in parallel relation to one another for subsequent expansion into a honeycomb structure.

A further object of the invention is to teach a method of longitudinally perforating or slotting the continuous web from which the honeycomb is made along spaced lines parallel to the lengthwise axis of the web and thereafter orienting the cut sheets within the stack in such manner that the perforated or interrupted lines of incisure formed in all of the sheets are registered with one another in spaced parallel aligned columns extending through the thickness of the stack to define a plurality of weakened perforate shear and/or saw guide columns through the stack.

Other numerous objects and advantages of the present invention will become apparent upon reading the following specification and referring to the accompanying drawings in which similar characters of reference represent corresponding parts in each of the several views.

In the drawings:

Fig. 1 is a substantially schematic view in perspective showing the principles of how the present method may be practiced.

Figs. 2—2a show in plan view a portion of an unexpanded stack of honeycomb manufactured according to the method with one part shown unexpanded and the other portion shown in expanded condition.

Fig. 3 is a substantially schematic view showing a modified practice of the method.

Fig. 4 is a fragmentary substantially schematic view showing a further modified practice of the method.

Fig. 3a shows in plan a section of a stack of honeycomb made in accordance with the practice of Fig. 4 and showing one portion of the stack in unexpanded condition and the other portion in expanded condition.

Fig. 3b is a view in plan showing a stack of the honeycomb made in accordance with the practice of Fig. 3 and showing one portion of the stack in unexpanded condition and the other portion in expanded condition.

Fig. 5 is a substantially schematic view in perspective showing how the material may be fabricated with weakened perforate shear or guide lines.

Fig. 6 is a perspective view of a honeycomb structure manufactured according to Fig. 5.

Fig. 7 is an enlarged fragmentary plan view of the web shown in Fig. 5.

Referring now more specifically to Fig. 1 of the drawings, the numeral 10 shows a continuous web of the material out of which the honeycomb is to be made such as metal foil, paper, resin impregnated glass or textile fabric. The said material is continuously fed from a roll 11 through a rotogravure printing head assembly indicated generally at 12. The assembly 12 may be substantially conventional in design and construction and may comprise a printing cylinder or drum 13 formed with engraved lines 14 consisting of recessed cells which, when rotated through and immersed in liquid adhesive tank 16, pick up and hold the adhesive. The usual doctor blade 17 is mounted adjacent cylinder 13 to wipe excess adhesive from the unengraved portions of the cylinder. As the web 10 passes between cylinder 13 and the rubber impression or back-up roller 18 one side or surface 19 of the web is imprinted with spaced, parallel adhesive lines 21 extending transversely of the lengthwise axis of the said web 10. In the event honeycomb is made utilizing a three-stage thermosetting resin adhesive (such as polyvinyl butyral) which permits it to be oven dried to a relatively dry, non-tacky condition, and then later advanced through application of additional heat to a thermoplastic flowable stage in which condition it may be made to flow and adhere to an adjacent surface, the lines of adhesive 21 may be oven dried by running the web through a suitable infra-red lamp or other type of oven indicated schematically at 22. Oven drying of the adhesive facilitates subsequent handling, cutting and stacking of the material without danger of smearing of the applied adhesive lines.

The reference numeral 23 indicates generally a cutting station which may comprise a conventional web sheeter assembly including a rotating blade 24 cooperable with a stationary blade 26 to cut the web material 10 into sections 10a of equal and desired lengths. Thereafter the cut sections 10a are superposed and adhered to one another to form a stack or block of honeycomb material such as indicated at 30. In the event a wet line adhesive is employed to print the lines 21, each sheet will adhere to an adjacent sheet along the lines 21 upon the sheets being placed in position within the stack. In the event an oven dried thermoplastic or thermosetting resin adhesive is employed, the entire stack may be first placed in a joggle table to insure uniform stacking of the sheets and subsequently placed in a suitable oven-press where, upon application of appropriate pressure and heat, the lines 21 may be caused to soften and flow into adhering contact with an adjacent surface of a contiguous sheet within the stack. The pressure and temperatures employed depend on the nature of the adhesive used and are factors well known or readily determinable within the skill of the art.

In cutting and stacking the cut sections 10a, it is essential that they be oriented and located properly within the stack 30 and in such manner that adhesive lines 21 adhering each adjacent two sections together are staggered relative to one another in the stack in order for the latter to be expanded into the cellular honeycomb material. Fig. 2 of the drawings indicate schematically the arrangement and pattern of stacked sections 10a as well as the relative location of the adhesive lines 21 within a stack 30. Fig. 2a illustrates how a section of such material can be expanded into the honeycomb pattern as illustrated and in which is defined by a plurality of sinusoidally curved or corrugated ribbons 10b extending in a common direction with their adjacent nodes 21a bonded together. Each cell of Fig. 2a is substantially hexagonal having six sides of equal length and with each two adjacent sides intersecting one another at approximately 120°. In order to obtain this substantially perfect hexagonal cell configuration, adhesive lines 21 are printed on the web 10 in the pattern indicated and wherein the spacing between adjacent lines 21 is made three times the width of each individual line 21. This relation is indicated by the letter T (indicating the width of each glue line s1) and by the symbol 3T (indicating the spacing between adjacent adhesive lines 21).

By way of example of how to cut the continuously moving web 10 into sections 10a of equal dimension and along lines of cut that will properly orient the adhesive lines within the stack in relatively staggered relation as aforesaid, the first section or piece cut from the web may be cut or sheeted by the rotary cutter or other means according to the formula:

$$X = T(4N+2)$$

and wherein X equals the sheet length in inches, T equals the width of each adhesive line in inches, and N equals the number of honeycomb node bonds 21a desired per sheet length. If the first or starting sheet is cut according to this formula, and thereafter the web is cut into sections of the same length, the adhesive lines of adjacently or consecutively cut sections will, when stacked together, be arranged within the stack with their glue lines properly oriented and staggered relative to one another. It is appreciated that the above formula is given as one satisfactory way of computing how to cut the web to insure proper orientation of the cut layers within the stack, but that there are other ways, mathematically or empirically, that may be used to determine the proper cutting cycle for the web.

With regard to the expansion of the adhered stack 30 of the glued sheets 10a, it is appreciated that the stack may be, if desired, initially cut or sliced into smaller sections of desired thickness prior to expansion thereof. In this connection, the stack 30 as shown in Fig. 1 may be cut or sawed along lines 27 which extend transversely to the adhesive lines 21 in the stack.

Fig. 3, and Figs. 3a—b indicate a modified practice of the present invention. In Fig. 3a continuous web 50 is advanced from a roll 51 through a first rotogravure adhesive printing assembly indicated generally at 52, and comprising more specifically an engraved cylinder 53 mounted in association with an adhesive tank 54 and a doctor blade 56. As the web 50 passes between the engraved cylinder 53 and impression roller 57 spaced parallel transverse adhesive lines 58 are applied to the obverse side 50a of the web.

The web is continuously advanced through a second gravure adhesive printing station, indicated generally at 59, and also comprising the components of an engraved cylinder 61, an adhesive tank 62, a doctor blade 63, and an impression roller 64. To prevent smearing of glue lines 58 applied to obverse side 50a of the web as it passes between cylinder 61 and impression roller 64, the latter may be provided with circumferentially spaced cut-outs or recesses 66 which are correspondingly spaced and rotated relative to the spacing and speed of movement of adhesive lines 58, whereby the cut-outs 66 in roller 64 continuously register with, and prevent smearing of said glue lines 58. Cylinder 61 may be rotated in a direction and speed directly synchronized and related to the speed and rotation of cylinder 53 whereby the engraved portion 61a of cylinder 61 applies spaced parallel adhesive lines 68 to the obverse side 50b of the web 50 and in such manner that the lines 68 are arranged in staggered parallel relation with reference to lines 58.

In the event there is employed a multiple stage thermosetting resin or other resin adhesive having thermo-plastic characteristics the web 50 may be advanced through an oven drying station indicated at 71 for the purpose of drying the adhesive lines to a substantially dry non-tacky condition to facilitate the steps of subsequently cutting and stacking the material.

The web with lines 58 and 68 applied to opposite sides thereof (and preferably oven dried) may then be advanced through a cutting station similar to the one previously described with reference to Fig. 1, and comprising a rotary blade 72 with a stationary blade 73 cooperable to cut the web 50 into sections 50 of equal length and dimension. Successively cut sheets are stacked one upon the other as shown, and adjacent sheets in the stack 75 are adhered together along matching lines of adhesive. In this connection it is noted that both the obverse and reverse adhesive lines 58 and 68 of each sheet is, within the stack, alternately staggered relative to corresponding obverse and reverse adhesive lines of each adjacent sheet whereby the obverse lines 58 of each section exactly register with and contact the reverse lines 68 of an adjacent sheet. In order to obtain proper orientation of the cut sheets it is necessary that the web 50 be cut in sections of equal length and in multiples of odd numbered adhesive lines counting the total number of both obverse and reverse side lines applied per section length. In Fig. 3 the sheeting or cut lines 76 are disposed every 5 adhesive lines.

Figs. 3a and 3b again show how a stack 75 of the superposed sheets of web material may be expanded into an open pack or section of hexagonal honeycomb material.

Fig. 4 discloses a still further modified practice of the invention and more specifically Fig. 4 may be considered to include a further extension or modification of the practice described with reference to Fig. 3. For purposes of convenient understanding it may be assumed that the web 150 in Fig. 4 has been fabricated precisely in accordance with the practices shown in Fig. 3 and which would have included the application of adhesive lines 158 to the obverse side 150a of the web and application of adhesive lines 168 to the reverse side 150b of the web. The left hand side of Fig. 4 indicates the web being advanced from the oven drying station 171—it being appreciated that certain elements of Fig. 4 are numbered correspondingly to equivalent elements of Fig. 3 but with the former designated in the 100 series.

Fig. 4 further discloses a roll 180 of blank web stock 181 being advanced from a feed-roller station 182 into a rotary cutter indicated generally at 183. Sections 181a cut from this blank web to which no adhesive lines are applied are inter-leafed between successively cut sections or sheets 159 cut at sheeter station 160 from web 150.

Once again it is observed that proper orientation of the glue lines 158—168 which will function to adhere all of the sheets 181a and 159 in the stack together as unexpanded honeycomb is accomplished by the particular manner in which the sections are cut or sheeted from the continuous web length. In the practice of Fig. 4 it is seen that each of the glued web sections are cut in even multiples of applied glue lines per cut section counting the total number of both the obverse and reverse applied lines 158 and 168. Specifically Fig. 4 discloses the number of lines per cut sheet as totalling four. The blank sections 181a are cut to the same length as sections 159 and are superposed and adhered into a stack 185. Like in previously described embodiments adjacent sections of sheet material within the stack are adhered together along alternately staggered lines of adhesive whereby the material may be expanded into an open cellular hexagonal structure such as shown in Fig. 4b.

Figs. 5, 5b and Fig. 6 illustrate a further concept of the invention applicable to manufacture of honeycomb according to any of the specific processes herein described. For purposes of convenient example Fig. 5 may be considered as exemplary of the type of web material 210 produced in accordance with the methods described with specific reference to Fig. 1. In this connection the web 210 is shown as having had applied to one surface 219 parallel transverse glue lines 221. This pattern of line may be obtained by running web 210 through the gravure adhesive printing assembly 12 of Fig. 1 and preferably thereafter advancing it through a suitable oven as indicated at 222 in Fig. 5. After oven drying of the adhesive lines 222 the web is advanced through a perforating zone 240 which may consist of any conventional sheet slotting or perforating mechanism well known in the paper and printing arts.

The mechanism 240 is operated to form a plurality of parallel lines 241 of closely spaced slots or perforations. The perforate lines 241 are applied in the direction of the web axis and perpendicular to the direction of transverse glue lines 221. Thereafter the web is advanced through a sheeting or cutting zone 224 which, for purposes of example, may be operated to cut the web in accordance with the formula given with reference to the practice of Fig. 1. The perforate sheets are stacked successively in the manner in which they are cut and the glue lines 221 are caused to adhere adjacent sheets in the stack together along alternately staggered lines of adhesive all as has been previously noted. It will be readily understandable that proper orientation of the sheets or sections 210a into the stack 230 will also cause the lines of perforation 241 to align with one another in spaced parallel registering columns extending through the thickness of the stack (from top to bottom as shown) to define a plurality of weakened perforated shear and/or saw guide lines through the stack.

Fig. 6 indicates how a stack 230 of the material may be sawed along the weakened perforate shear lines 241 extending through the thickness of the stack. It is appreciated that the width of the slots or perforations 221 may be made approximately equal to the thickness of the saw or knife blade which will ultimately be used to saw or cut the block 230 into individual slices or sections. This being so it is evident that the blade will have to remove or cut through only a relatively small percentage of solid material in order to traverse completely through one of the perforated columns with a consequent saving in labor, time and equipment use required in the slicing of the block into individual slices.

It is also contemplated in certain types of honeycomb material such as paper stock, the provision of weakened perforated columns will permit slices of the stock to be forcefully broken or sheared off without necessity of sawing or cutting through the material with a sawing or cutting instrument.

Although the present invention has been described in some detail by way of illustration and example for purposes of clarity of understanding it is understood that certain changes and modifications may be made within the spirit of the invention as limited only by the scope of the claims appended hereto.

What is claimed is:

1. In a method of making structural honeycomb material from a continuous web of sheet material the steps comprising: applying to one side of a said continuous web equidistantly spaced parallel lines of adhesive extending transversely uninterruptedly substantially the full width of said web; transversely cutting said web into sections of equal length according to the formula:

$$X = T(4N+2)$$

and wherein X equals the sheet length in inches, T equals the width of each adhesive line in inches, and N equals the number of adhesive node bonds per cut sheet length; and superposing consecutively cut sheets one upon the other of the stack and adhering said cut sheets together along said adhesive lines with the lines of adhesive of each adjacent two sheets in said stack staggered relative to one another to define a section of expansible honeycomb material.

2. In a method of making structural honeycomb material from continuous web material the steps comprising: applying to at least one side of at least one continuous web of sheet material spaced parallel lines of adhesive extending transversely uninterruptedly substantially the full width of said web material; forming spaced parallel interrupted lines of incisure through said web material extending parallel to the lengthwise axis of said web and perpendicular to and intersecting said transverse adhesive lines; transversely cutting said web material into sections of predetermined equal dimensions; superposing said sections in a stack and adhering said sections to one another along said lines of adhesive with the adhesive lines of each adjacent two sheets staggered relative to one another and with the interrupted lines of incisure formed in all of said sheets registered with one another in spaced parallel aligned columns extending through the thickness of said stack defining a plurality of weakened perforate shear lines through said stack.

3. In a method of making structural honeycomb material from continuous web sheet material the steps comprising: applying to at least one side of at least one continuous web spaced parallel lines of adhesive extending transversely uninterruptedly substantially the full width of said web material; forming spaced longitudinal lines of incisure through said web material extending substantially perpendicular to said transverse adhesive lines;

superposing into a stack a plurality of layers of said web material; adhering adjacent layers within said stack together by said adhesive lines and with the adhesive lines adhering each adjacent two layers within said stack staggered relative to one another and with the interrupted lines of incisure formed in said stacked layers of web material registered with one another in spaced aligned columns extending through the thickness of said stack defining a plurality of weakened perforate shear lines through said stack.

4. In a method of making structural honeycomb material from continuous web sheet material the steps comprising: applying to at least one side of at least one continuous web equidistantly spaced parallel lines of adhesive with each said line extending transversely and uninterruptedly substantially the full width of the said web; transversely cutting said web into sections of equal dimensions; superposing said sections one upon the other in a stack with the sections juxtaposed and in coplanar relationship; performing the aforementioned step of cutting in reference to the relative positions of said adhesive lines applied to the web material whereby the adhesive lines of consecutively cut sections, when superposed in a stack one upon the other in coplanar juxtaposed position, are alternately disposed in staggered relation to one another throughout the height of the stack; and adhering said sections to one another in said stack along said lines of adhesive whereby said stacked sheets define expansible honeycomb material.

5. In a method of making structural honeycomb material from continuous web sheet material the steps comprising: applying uninterrupted transverse lines of adhesive to opposite sides of a first continuous web of material such that the lines on one side are staggered relative to the lines on the other side and such that said line extends uninterruptedly substantially the full width of the web material; transversely cutting said first web into sections of predetermined equal length; transversely cutting a second continuous web of sheet material having no adhesive thereon into sections of equal dimensions to the cut sections of said first web; stacking the cut sections of said first and second webs in alternate fashion in a single stack by interleafing between each two consecutively cut sections from said first web a section cut from said second web; performing the aforementioned step of cutting the first web into sections of equal length in reference to the relative positions of adhesive lines applied thereto so that corresponding adhesive lines on opposite sides thereof are staggered relative to one another in said stack; and adhering together the stacked sections along said adhesive lines to form a block of expansible honeycomb material.

6. In a method of making structural honeycomb material from continuous web sheet material the steps comprising: applying uninterrupted transverse lines of adhesive to one side only of first and second continuous webs of material with each line extending uninterruptedly substantially the full width of the webs; cutting alternately said first and second webs into sections of predetermined equal length and superposing the consecutively cut sections one upon the other in juxtaposed coplanar relation to form a single stack of sections; performing the aforementioned cutting of the webs into sections so as to cut consecutive sections in reference to the positioning of adhesive lines thereon whereby the adhesive lines on each cut section will be disposed in staggered relation to each of its adjacent sections in the stack; and adhering together the stacked sections along said adhesive lines to form a block of expansible honeycomb material.

7. In a method of making from continuous web sheet material a structural honeycomb assembly comprising at least two superposed web sections, the steps of: applying to a side of such web a succession of parallel lines of adhesive extending transversely of the web and evenly spaced apart longitudinally thereof, each of said lines of adhesive extending substantially the full width of said web, transversely successively cutting from said web sections thereof of equal longitudinal dimension, the end edge portions of one of said sections being free of said adhesive lines, and the similar end edge portions of another of said sections being substantially bordered by said lines of adhesive, superposing said sections with their said end edges in alignment whereby the adhesive lines of one of these sections are alternately disposed in staggered relation to the adhesive lines of the other section, adhering said sections to one another along said lines of adhesive, whereby said sections when separated along the voids between the lines of adhesive serve to define expanded honeycomb material.

References Cited in the file of this patent

UNITED STATES PATENTS

| | | |
|---|---|---|
| 765,412 | Budwig | July 19, 1904 |
| 1,924,472 | Thomson | Aug. 29, 1933 |
| 2,428,979 | May | Oct. 14, 1947 |
| 2,553,054 | Lincoln et al. | May 15, 1951 |
| 2,581,421 | Lombard et al. | Jan. 8, 1952 |
| 2,610,934 | Steele | Sept. 16, 1952 |
| 2,649,131 | Lincoln | Aug. 18, 1953 |
| 2,670,314 | Ungar | Feb. 23, 1954 |
| 2,734,843 | Steele | Feb. 14, 1956 |